Dec. 12, 1933.  W. R. GOEHNER ET AL  1,938,694
SOUND FILM RECORDING APPARATUS
Filed July 6, 1932   3 Sheets-Sheet 1
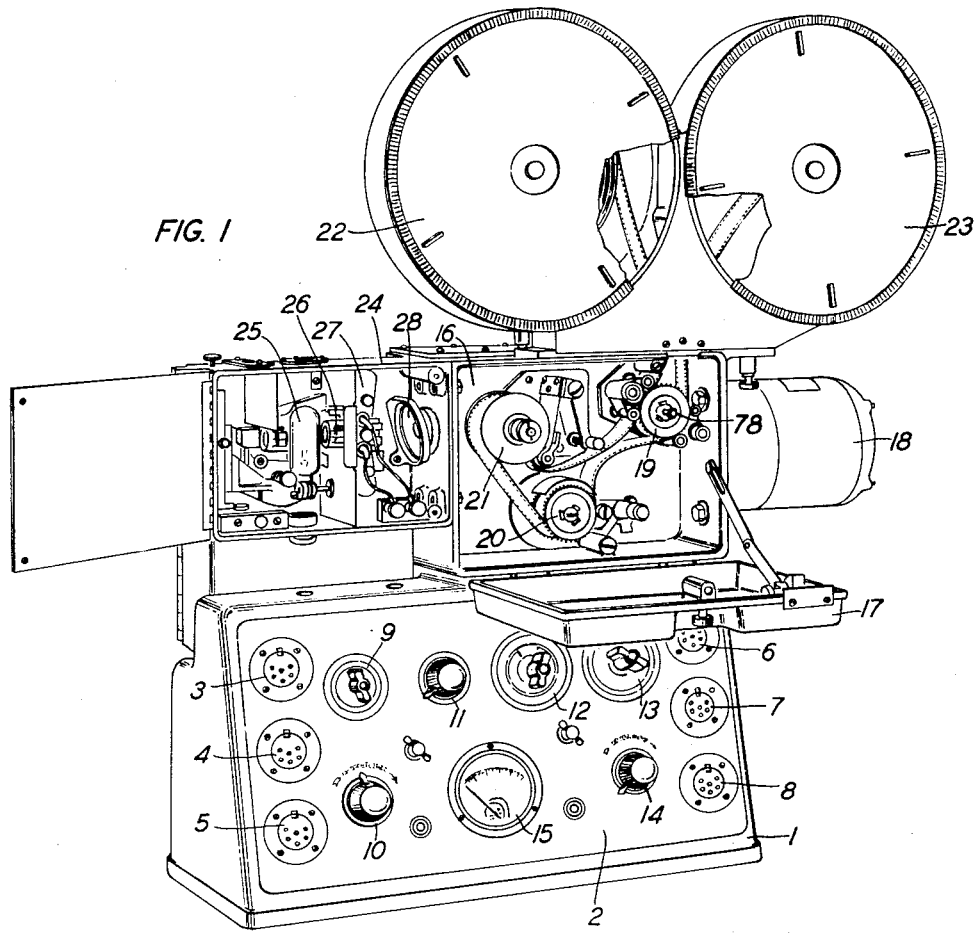
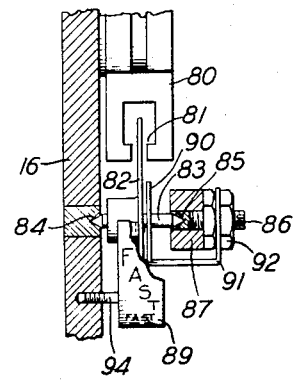
INVENTORS W. HERRIOTT
W. R. GOEHNER
BY
G. H. Heydt
ATTORNEY Dec. 12, 1933.     W. R. GOEHNER ET AL     1,938,694
SOUND FILM RECORDING APPARATUS
Filed July 6, 1932     3 Sheets-Sheet 2

INVENTORS  W. HERRIOTT
W. R. GOEHNER
BY
G. H. Heydt
ATTORNEY

Dec. 12, 1933.  W. R. GOEHNER ET AL  1,938,694
SOUND FILM RECORDING APPARATUS
Filed July 6, 1932    3 Sheets-Sheet 3
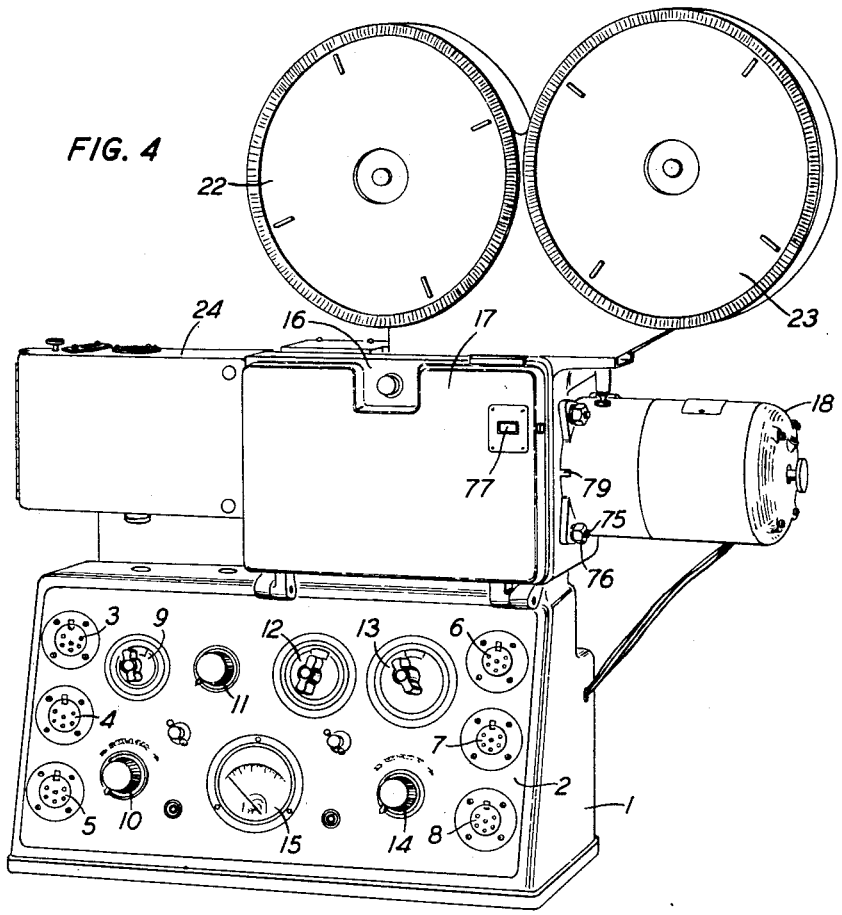
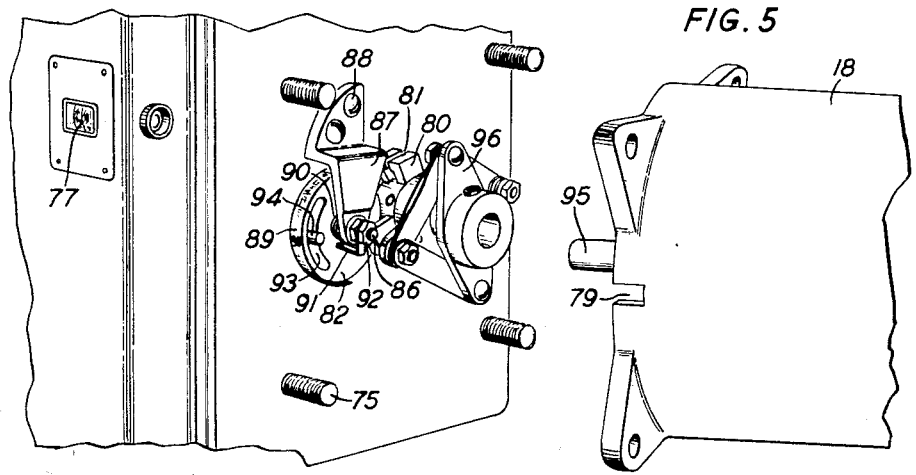
INVENTORS: W. HERRIOTT
W. R. GOEHNER
BY
G. H. Heydt.
ATTORNEY Patented Dec. 12, 1933

1,938,694

UNITED STATES PATENT OFFICE 1,938,694

SOUND FILM RECORDING APPARATUS

William R. Goehner, East Orange, N. J., and William Herriott, Freeport, N. Y., assignors to Bell Telephone Laboratories, Incorporated, New York, N. Y., a corporation of New York Application July 6, 1932. Serial No. 620,994

6 Claims. (Cl. 179—100.3)

This invention relates to sound film recording systems and more particularly to sound monitoring devices employed in such systems.

It has been the general practice to monitor the sound being recorded on a negatve photographic film by placing a photoelectric cell directly behind the film, to receive the modulated light after it has passed through such film on which sound has been recorded.

It has been found that the system of monitoring just described does not provide a sufficiently true reproduction of the recorded sound within the limits required for efficient monitoring. This condition is caused by the distortion introduced by the moving negative film in its passage through the light beam in front of the photoelectric cell.

It is the object of this invention to provide, in a sound film recording system, a monitoring system which will reproduce faithfully and without distortion the sound being recorded on the negative photographic film.

Another object of the invention is to provide, in a sound film recording system, means for monitoring directly from the modulated light beam without producing distortion of such beam during its passage to the recording medium.

A further object of the invention is the provision of a monitoring unit capable of use in portable apparatus wherein the space allowable for such units must be limited.

A feature of the invention lies in the provision of an annular concave mirror located adjacent the objective lens unit to collect and deflect, for monitoring purposes, all of the modulated light not used for recording.

The nature of the invention will be clearly understood from the following description with reference to the accompanying drawings, in which, Fig. 1 is a perspective view of a portable recording machine with the compartment doors open;

Fig. 4 is a perspective view of the recording machine showing the position of the driving motor;

Fig. 5 is an enlarged perspective view of the recording machine with the driving motor removed to reveal the motor speed indicating device;

Fig. 6 is a view showing in detail the method of mounting the speed indicating disc.

Figure 3:
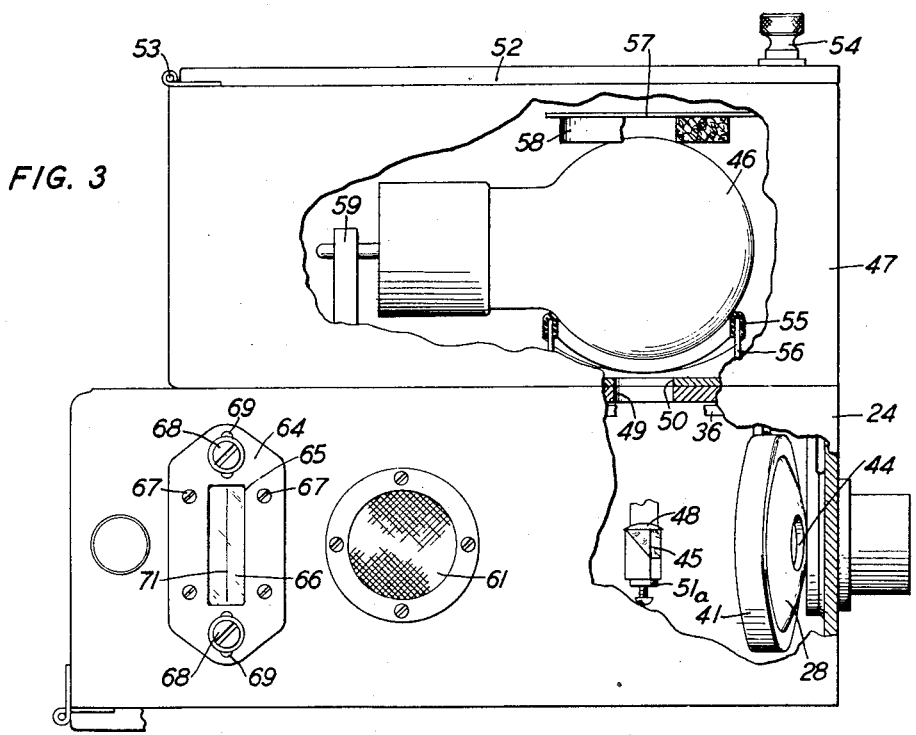
Fig. 3 is a plan view of the compartment shown on Fig. 2 together with a plan view of a photoelectric cell compartment attached to the modulator unit compartment.

In Fig. 1 is shown a portable sound film recording apparatus comprising a base 1, one side of which forms a panel 2 containing various control units and jacks for connection to associated apparatus. Jacks 3, 4 and 5 afford a means of connection to the amplifier, noise reduction unit and photoelectric cell B battery, respectively. Jacks 6, 7 and 8 afford a means of connection to a supply source for an alternating current motor, battery supply for an exciting lamp, and the battery supply for a direct current motor, respectively. Other control units include a switch 9 for the exciting lamp, a current control unit 10 for the exciting lamp, a noise reduction control unit 11, a direct current motor switch 12, an alternating current motor switch 13, a speed control unit 14 for the driving motor, and an ammeter 15 for indicating the current supplied to the exicting lamp. It will be seen that provision is made for power supply for either a direct current or alternating current driving motor.

Mounted on the base 1 is a compartment 16 having a hinged door 17. On one end of this compartment is mounted a driving motor 18 which may be either a direct current or alternating current motor depending upon the nature of the supply available. Within the compartment 16 is located a film driving mechanism including a film driving sprocket 19, a constant speed film driving sprocket 20 and a tension or drag roller 21 located at the exposure aperture. The sprocket 19 is geared directly to the driving shaft of the motor 18 while the constant speed sprocket 20 is driven from the motor shaft through a flywheel coupling. The film driving mechanism just described is disclosed in detail and forms the subject matter of a United States application Serial No. 590,543, filed February 3, 1932, for E. T. Mottram.

A unit mounted on top of compartment 16 includes a feed reel chamber 22 and a take-up reel chamber 23.

A compartment 24 located adjacent the compartment 16 contains the devices constituting the modulator unit of the recording apparatus. The devices contained within this compartment include an exciting lamp 25, a condenser lens system 26, a light valve 27 and a concave annular mirror 28. The light valve 27, employed with this unit, is disclosed in detail in United States application Serial No. 486,382, filed October 4, 1930, E. C. Wente.

Figure 2:
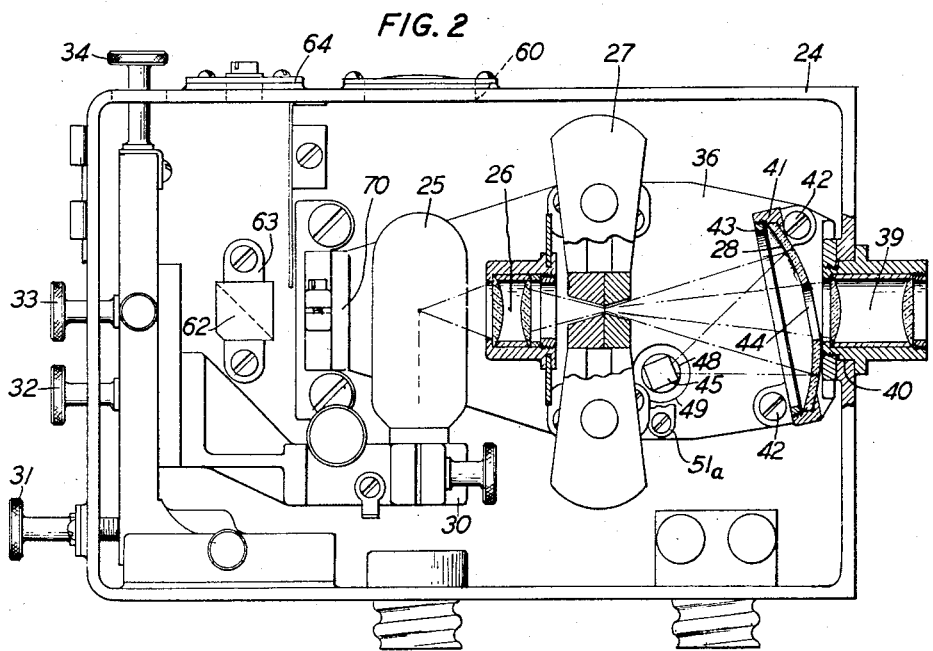
Fig. 2 is a side elevation of the interior of the modulator unit compartment.

Figs. 2 and 3 disclose in detail the arrangement of the parts included within the compartment 24. The exciting lamp 25 is mounted in a base 30 which may be adjusted, by means of the various adjusting devices 31, 32, 33 and 34, to bring the filament of the lamp 25 into the proper position with respect to the other devices constituting the modulator unit. A plate 36, adjustably mounted on the inner wall of the compartment 24 by means not shown, has removably attached thereto a condenser lens system 26, the light valve 27 and the concave annular mirror 28. The reason for adjustably mounting the plate 36 is to provide a means for adjusting the light valve 27 with respect to the lamp filament and objective lens. A unit 39 containing the objective lens system is mounted in an opening 40 in one wall of the compartment 24. This unit extends into compartment 16 adjacent the tension roller 21 (Fig. 1) which supports the recording film.

The monitoring unit forming the subject matter of this invention includes an annular concave mirror 28 mounted in a member 41 which is attached to plate 36 by means of screws 42. The mirror is held secure in member 41 by means of externally threaded ring member 43 which engages the internally threaded portion of member 41. The mirror 28 has at its center a circular hole 44 of a diameter sufficient to pass to the objective lens system 39 the modulated light required for recording. The optical axis of the mirror is slightly inclined to the common axes of the condenser and objective lens systems. The curvature of the mirror 28 is such that the beam reflected thereby will be focussed on a prism 45 which deflects the light beam to a photoelectric cell 46 located in a compartment 47 detachably secured to compartment 24. On the emergent face of prism 45 is located a collimating lens 48 which tends to reduce the divergence of the rays directed toward the cathode of the photoelectric cell 46 through aligned openings 49 and 50 in the abutting walls of compartments 24 and 47, respectively. The prism 45 may be rotatably adjusted by means of a screw 51 extending through the bracket 51a.

On the compartment 47 there is provided a door 52 hinged at 53 and having a knob 54. Within the compartment 47, the photoelectric cell 46 bears against a ring member 55 made of some suitable resilient material mounted on members 56, secured to the compartment 47. A spring member 57 having a padded portion 58 bearing against the envelope of the cell 46 produces a pressure thereon sufficient to maintain the cell in contact with the member 55 to prevent vibration thereof.

The cell 46 is electrically connected, through socket 59, to an amplifier and an associated sound reproducing device. The sound reproducing device may take the form of a headset to be worn by the monitoring operator or it may take the form of a loudspeaker located near such operator.

An outlet for the heat from lamp 25 is provided in the form of a circular opening 60 covered by a grating 61.

As a means for insuring the correct adjustment of a replacement lamp in the event lamp 25 should become inoperative, there is provided a deflecting prism 62 which is rotatably mounted on a member 63 secured to the compartment 24, and a movable member 64 having an opening 65 therein. A sheet of transparent material 66 is arranged to cover the opening 65 and is secured to member 64 by means of screws 67. Member 64 may be secured to the compartment 24 by means of screws 68. However, the slot 69 permits adjustment of members 64 across the compartment 24 before tightening of the screws 68.

A lens system located in the bracket 70 projects an image of the filament of lamp 25 to the prism 62, which deflects this image to the transparent member 66.

After the lamp 25 and the light valve 27 have been adjusted for operation, the prism 62 and member 64 are adjusted until the image of the filament of lamp 25 is aligned with a hair line 71 on member 66. In the event the lamp 25 should need replacement, the replacement lamp would be adjusted by means of adjusting members 31, 32, 33 and 34 until an image of its filament is aligned with the hair line 71. This latter adjustment insures the correct adjustment of the replacement lamp with respect to the light valve 27.

Referring to Fig. 4, the driving motor 18 is secured to the casing of compartment 16 by means of bolts 75 and nuts 76. Provided on the door 17 is a gear driven film footage counter 77. The driving gear of the counter meshes with a gear 78 (Fig. 1) mounted on the extreme end of the shaft supporting the driving sprocket 19. The ratio of the gears is such that the counter indicates directly in feet, the length of film drawn from the feed reel 22.

An opening 79 located in the motor casing affords a means of viewing the film speed indicator attached to the side of the casing of compartment 16, as shown clearly in Figs. 5 and 6.

The speed indicator mentioned comprises a permanent magnet 80 secured to the motor driven shaft 95. This magnet has four radial arms, each of which are slotted, as shown at 81. A graduated disc 82 made of some suitable material, preferably aluminum, is secured to shaft 83. One end of shaft 83 terminates in a bearing 84 in one wall of compartment 16, while the other end of shaft 83 terminates in a bearing 85 located in one end of a screw member 86. Screw member 86 is supported in one end of a bracket arm 87, the other end of which is secured to compartment 16 as shown at 88 (Fig. 5).

On the periphery of disc 82 is provided a graduated scale 89. This scale covers only 180° of the periphery of the disc 82 and is arranged adjacent the opening 79.

Rotation of the magnet 80 will cause a rotation of the disc 82 due to the eddy current drag. To prevent complete rotation of the disc and to provide a means of adjusting the degree of rotation of such disc, there is provided a coil spring 90, the inner end of which is attached to shaft 83 and the outer end of which is attached to one end of a bracket 91. The other end of bracket 91 is pivoted on screw member 86. By rotation of the bracket 91 about member 86, the tension in the spring 90 may be increased or decreased depending upon the direction of rotation of the member 91.

As the correct speed of the film in such apparatus is 90 feet per minute, the speed of the driving shaft necessary to drive the film at 90 feet per minute is first determined. With the driving shaft rotating at this known speed the tension in the spring 90 is adjusted until the rotation of disc 82 is such that the indication "90", on the graduated scale 89, is aligned with the opening 79.

The bracket member 91 is secured in adjusted position by means of nut 92, threaded on screw member 86.

To insure a limited rotation of disc 82 and also to balance the effect of the scale 89 on one-half of the periphery of disc 82, there is provided a slot 93 into which is inserted a pin 94 (Fig. 5), one end of which is threaded in the compartment wall as shown in Fig. 6.

The film driving mechanism included in compartment 16 is driven by the motor shaft 95 through resilient coupling 96, of a well known type.

It will be obvious from the above description that applicants have provided a portable film recording machine of compact construction incorporating a useful and novel sound monitoring device.

What is claimed is:

1. In a sound film recording apparatus, a movable film, means for projecting a beam of light, means for modulating said light beam in accordance with the sounds to be recorded, a lens for projecting said modulated beam towards said movable film, a deflecting prism located below said modulated beam adjacent said modulating means, a concave annular mirror interposed in said modulated beam at an angle to the axis thereof and arranged to reflect the portion of said beam intercepted thereby towards said prism, and a photoelectric cell arranged to receive the beam deflected by said prism.

2. In a sound film recording apparatus, a movable film, means for projecting a beam of light, means for modulating said light beam in accordance with the sounds to be recorded, an objective lens for projecting said modulated beam towards said movable film, means for monitoring the sounds being recorded, said means comprising an annular mirror interposed in said modulated beam and arranged to intercept and reflect the total portion thereof not projected to said objective lens, and means arranged to intercept and deflect towards sound reproducing means the beam reflected by said mirror.

3. The combination in a sound film recording system having means for modulating a beam of light and an objective lens for projecting said modulated beam to said film, means for monitoring the sounds being recorded on said film, said means comprising a deflecting prism located below said modulated light beam adjacent said modulating means, a concave annular mirror located adjacent said objective lens at an angle to the axis of said light beam and arranged to reflect to said prism modulated light included in the outer portion of said light beam, and means arranged to receive and convert into modulated electrical currents the light beam deflected by said prism.

4. In a sound film recording apparatus, a movable film, means to project a beam of light, means for modulating said light beam in accordance with the sounds to be recorded, an objective lens for projecting said modulated beam to said film, a circular mirror interposed in said modulated beam preceding its passage to said objective lens, said mirror containing a circular hole to allow passage of the central portion of said beam to said objective lens and arrange to reflect the remaining portion of said beam towards said modulating device at an angle to the axis of said objective lens, and means arranged to intercept and deflect the portion of said modulated beam reflected by said mirror.

5. In combination, a sound film recording system having means for modulating a beam of light and optical means for projecting said modulated beam to said film, of means for deflecting a portion of said modulated beam for monitoring purposes, said means comprising a concave annular mirror interposed in said modulated beam at an angle to the axis of said optical means.

6. In a sound film recording apparatus, a movable film, means to project a beam of light, means for modulating said light beam in accordance with the sounds to be recorded, optical means for projecting said modulated beam to said film, a concave annular mirror interposed in said modulated beam at an angle to the axis of said optical means and arranged to reflect a portion of said modulated beam, and means arranged to receive and convert into modulated electrical currents said reflected beam.

WILLIAM R. GOEHNER.
WILLIAM HERRIOTT.